July 12, 1966   H. LERMAN ETAL   3,260,485
INERTIAL NAVIGATION
Filed March 21, 1962   10 Sheets-Sheet 1

HAROLD LERMAN
NEIL A. SANCHIRICO
JOHN P. SPUTZ
INVENTOR.

BY S. A. Giarratana
George B. Oujevolk
ATTORNEYS

HAROLD LERMAN
NEIL A. SANCHIRICO
JOHN P. SPUTZ
INVENTOR.

July 12, 1966    H. LERMAN ETAL    3,260,485
INERTIAL NAVIGATION

Filed March 21, 1962    10 Sheets-Sheet 6

FIG. 8

HAROLD LERMAN
NEIL A. SANCHIRICO
JOHN P. SPUTZ
INVENTOR.

BY S. A. Giarratana
George B. Oujevolk
ATTORNEYS

HAROLD LERMAN
NEIL A. SANCHIRICO
JOHN P. SPUTZ
INVENTOR.

July 12, 1966 H. LERMAN ETAL 3,260,485
INERTIAL NAVIGATION
Filed March 21, 1962 10 Sheets-Sheet 10

HAROLD LERMAN
NEIL A. SANCHIRICO
JOHN P. SPUTZ
INVENTOR.

BY S.A. Giarratana
George B. Oujevolk
ATTORNEYS

3,260,485
INERTIAL NAVIGATION
Harold Lerman, Paramus, N.J., Neil A. Sanchirico, Bronx, N.Y., and John P. Sputz, Oakland, N.J., assignors to General Precision Inc., Little Falls, N.J., a corporation of Delaware
Filed Mar. 21, 1962, Ser. No. 181,294
6 Claims. (Cl. 244—77)

This invention relates to inertial navigation systems, and more particularly to a versatile system for achieving and maintaining the alignment of the gyro platform in an inertial navigation system.

Prior to the present invention inertial navigation systems, in order to have the desired accuracy, required that the gyro platform be precisely aligned on the ground and this alignment of the platform required precious time. Moreover, in the systems of the prior art the accuracy of the alignment continuously degrades in flight. Thus the systems of the prior art are limited in their utility.

In the system of the present invention, a ground align program or a flight align program may be selected. In the flight align program the system is designed to be ready after a much shorter time on the ground and in emergencies such as a scramble operation even the short ready time on the ground can be eliminated. Furthermore, the accuracy of the alignment in the flight align program does not degrade with time. The alignment that can be achieved on the ground is more precise and has greater accuracy than the alignment achieved in flight in the flight align program. Consequently for a substantial period after takeoff, a system which is precisely aligned on the ground will have greater accuracy than that achieved in the flight align program. Accordingly, the ground align program is provided in the system so that the superior accuracy of precise alignment on the ground may be taken advantage of when there is sufficient time before takeoff for fine alignment on the ground.

The alignment of the platform during flight is made possible by means of a velocity reference determined from a Doppler radar signal. The velocity reference is compared with the velocity of the aircraft indicated by the inertial navigation system and the difference is used to level the platform and carry out gyrocompassing. In this manner the alignment of the platform is achieved and maintained during flight.

Accordingly, a principal object of the present invention is to provide an improved inertial navigation system.

Another object of the present invention is to provide an improved system for aligning the gyro platform in an inertial navigation system.

A further object of this invention is to reduce the amount of time required on the ground for the alignment of the gyro platform in an inertial navigation system.

A still further object of this invention is to provide a system for aligning the gyro platform of an inertial navigation system in flight without the accuracy of the alignment degrading as the duration of the flight increases.

A still further object of this invention is to provide a system for gyrocompassing during flight.

A still further object of this invention is to provide a system in which precise alignment of the gyro platform takes place during flight.

A still further object of this invention is to provide a system in which the precise alignment of the platform may be selected to take place on the ground or in flight.

A still further object of this invention is to provide a system which can be operated in a grid mode and then switched to operate in a gyrocompassing mode.

A still further object of this invention is to provide a mode of operation in which the azimuth gyro is offset from north a predetermined angle.

Further objects and advantages of the present invention will become readily apparent as the following detailed description of the invention unfolds and when taken in conjunction with the accompanying drawings, wherein:

Figure 1:
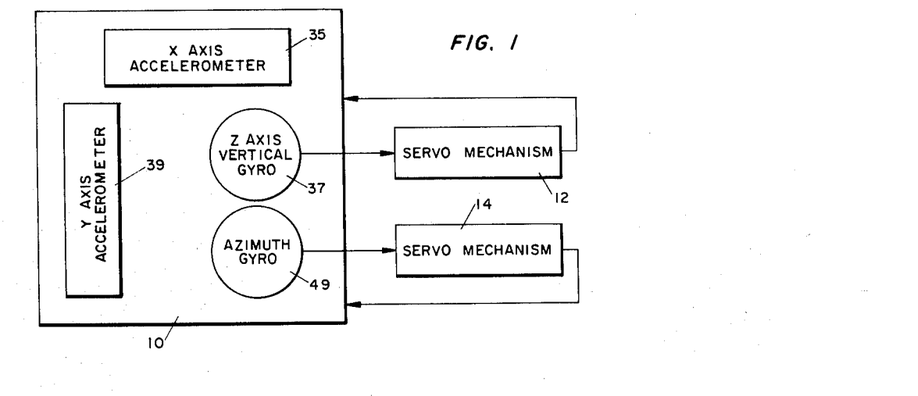
FIG. 1 is a schematic diagram of the gyro platform and its associated circuitry.

In the inertial navigation system of the present invention as shown in FIG. 1, two gyros 37 and 49 are mounted on a platform 10 along with two accelerometers 35 and 39. The platform 10 is mounted to be freely rotatable with respect to the aircraft frame by means of a conventional four gimbal arrangement. The gyro 37 is referred to as the vertical gyro, and the gyro 49 is referred to as the azimuth gyro. The vertical gyro 37 is maintained by the system aligned with vertical and the azimuth gyro is normally maintained aligned with north. The platform is provided with three mutually perpendicular axes designated the X axis, the Y axis and the Z axis. By means of a servomechanism 12 operating in response to the position of the vertical gyro 37, the platform 10 is maintained aligned with the vertical gyro so that the Z axis of the platform is maintained aligned with the vertical gyro. When the vertical gyro is aligned with vertical, the Z axis will be aligned with vertical. When the Z axis is aligned with vertical, the platform is referred to as being "level" and the alignment of the Z axis with vertical by aligning the vertical gyro is referred to as "levelling" the platform. A servomechanism 14 operating in response to the position of the azimuth gyro maintains the X and Y axes of the platform aligned with a chosen reference such as true north. The accelerometer 35, referred to as the X axis accelerometer, is mounted on the platform 10 to sense the acceleration of the platform along the X axis of the platform and will produce an output signal when the platform is accelerated representing the component of the acceleration along the X axis of the platform. The other accelerometer, 39, referred to as the Y axis accelerometer, senses the acceleration of the platform 10 along the Y axis and when the platform is accelerated it produces an output signal representing the component of acceleration along the Y axis of the platform.

Figure 2:
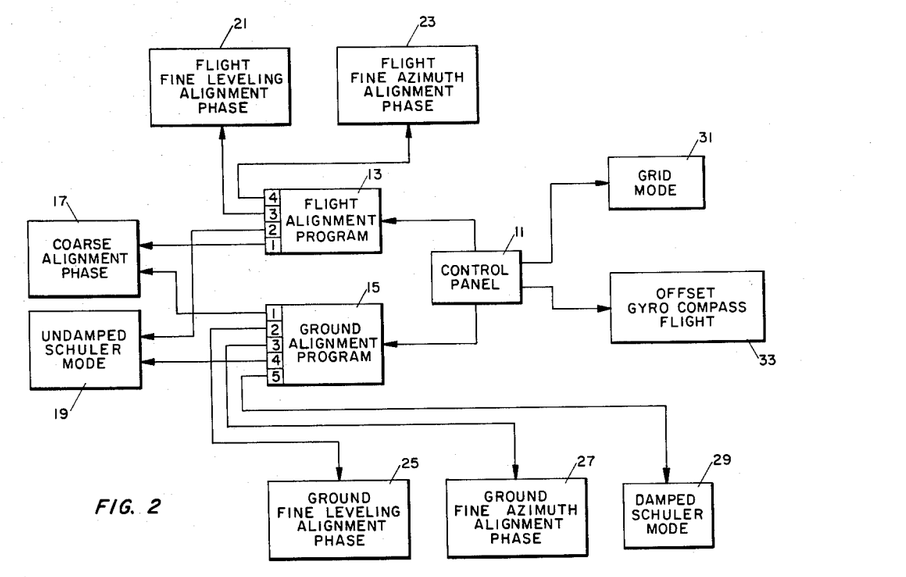
FIG. 2 is a block diagram of the overall system of the invention.

As is illustrated in the block diagram of FIG. 2, the pilot, by means of the control panel 11, may select either the flight align program 13 or the ground align program 15. Each of these programs 13 and 15 will cause an automatic sequence of operations which will provide the pilot with proper navigational information. For the first four hours of flight the ground align program 15 will provide more accurate navigational information than the flight align program 13, but the ground align program requires fifteen minutes on the ground after the program has been initiated. Consequently, the pilot will only select the ground align program when he has sufficient time before flight. When it is imperative that the pilot take off immediately, as in a scramble operation, or when the pilot must take off in less than the fifteen minutes required for the ground align program 15, the pilot will select the flight align program.

When the flight align program 13 is initiated it automatically starts the system to operate in the coarse alignment phase 17, which takes place before taxiing of the plane begins. In the coarse alignment phase 17 wheel power is applied to the gyros immediately. Fifteen seconds later when the gyro wheels have reached 10% of synchronous speed, power is removed from the gyro wheels and the gyros are allowed to coast for twenty seconds. During the first fifteen seconds the outer roll gimbal of the gyro platform is case aligned, bringing it to aircraft level. The azimuth, inner roll, and pitch gimbal loops are closed at the time wheel power is removed from the gyros. Coarse level alignment is concluded at the end of the twenty second coast interval. Coincident with the removal of power from the gyro wheels, the accelerometer outputs are fed to the vertical gyro to level the platform. The platform will be within 4 degrees of level by the time the gyro wheel power is reapplied twenty seconds later. After another ten-second delay, the azimuth gyro is aligned to true north. True north is determined by the magnetic heading and the known magnetic variation. The system will remain in this mode of operation until takeoff, at which time the system is automatically switched to phase 19, in which the system operates in an undamped Schuler mode north slaved in azimuth. An acceleration switch senses when taxiing begins and causes the system to switch from phase 17 to phase 19. The undamped Schuler mode of operation is used only as an intermediate step until a Doppler signal is received. During the Schuler operation, the accelerometer outputs on the gyro platform are fed to integrators, thereby providing ground speed outputs. Computed gyro torquing rates are applied to the gyro torquers. In response to receiving a Doppler signal, the flight align program 13 automatically switches the system to operate in the flight fine level alignment phase 21. This phase serves to refine the level achieved during the coarse ground alignment. Since this fine alignment is done on a moving base a damped Schuler operation is used. This damped Schuler operation makes use of an external velocity reference derived from the Doppler radar signal received. The velocity indicated by the integrators of the system is compared with the velocity derived from the Doppler signal to produce an error signal proportional to the difference between the velocity obtained from the Doppler signal and the velocity indicated by the integrators intergrating the accelerometer outputs. This error signal is fed to the vertical gyro to correct the indicated error. In this manner, all initial errors in the leveling of the platform are asymptotically reduced. The system remains in this fine level alignment phase 21 for a predetermined length of time and then the flight align program automatically switches the system to operate in the flight fine azimuth alignment phase 23. This phase 23 provides the system with fine azimuth alignment, which is accomplished by means of a gyrocompassing loop. This phase 23 is an extension of the fine leveling alignment loop used in the phase 21. The gyrocompassing is obtained by feeding the error in velocity not only to the vertical gyro but also to the azimuth gyro. This causes the azimuth gimbal to align itself to true north within the inherent accuracy limits of the system components. The system will then continue to operate in the fine azimuth alignment phase 23 supplying the desired navigational data. The flight alignment program takes thirty minutes to bring the system to its maximum accuracy, which it will maintain as long as the system remains in the fine azimuth alignment phase 23.

In a scramble mission when the pilot does not even have the three minutes for the coarse alignment phase 17 to take place on the ground, the flight alignment program 13 can still be used. The program can be initiated even after the plane is airborne, in which case the gyromotor coast period of the coarse alignment phase 17 is skipped. When the coarse alignment phase 17 is thus modified it increases the time for the system to reach a steady state in which maximum accuracy of the navigational information from the system is obtained.

When the ground align program 15 is selected, it initiates first the coarse alignment phase 17, which operates identically in the manner described with respect to the flight align program. The ground align program after the coarse alignment phase 17 continues the alignment on the ground in contrast to the sequence of operations which takes place in the flight align program 13. The ground fine leveling alignment phase 25 and the ground fine azimuth alignment phase 27 are timed to follow the coarse alignment phase 17 in that order. Both of these phases 25 and 27 are closely related to their counterparts 21 and 23 in the flight align program 13. The only difference is that on the ground no Doppler velocity reference is required. The same error signals are fed to the gyros, but the reference velocity is now zero instead of a Doppler reference velocity. The total ground alignment phase continues for a minimum of fifteen minutes. Any time thereafter the system is ready for flight. When the plane begins to taxi, in the ground align program, an acceleration switch automatically switches the system to operate in the undamped Schuler mode phase 19. The system will then continue to operate in an undamped Schuler mode until a Doppler signal is received, at which time the ground align program 15 automatically switches the system into the phase 29, in which the system operates in a damped Schuler mode. The phase 29 is designed to maintain the level accuracies achieved during the fine level alignment phase 25. The level in the damped Schuler mode phase 29 is maintained in the same manner as in the flight fine alignment phase 21 during the flight align program 13. The azimuth alignment is maintained by causing the azimuth gyro to pivot at a rate equal to the meridian convergence rate plus the earth's rotation rate. In the ground align program, accurate navigational output information is obtained and kept up to date from the instant the aircraft begins to taxi.

The pilot, by means of the control panel 11, may also select the phase 31, in which the system operates in a grid mode, which can be used in conjunction with either the flight align program 13 or the ground align program 15. The mode of operation is primarily needed for flights over the polar regions, but it may be initiated at any time by the pilot or navigator. When the grid mode phase 31 is selected, the system is unslaved from its north coordinate frame of operation and simultaneously an integrator begins to operate and compute the platform heading change with respect to true north. If after operating in the grid mode phase 31 the operator wishes again to operate in a north slaved mode, the pilot can switch the system to operate in the offset gyrocompassing flight phase 33. In the phase 33 the system is gyrocompassed to the offset angle accumulated by the integration operation in the grid mode phase 31. This gyrocompassing to the offset angle eliminates the transients that would take place if the platform were slaved back to true north.

*Coarse alignment phase*

Figure 3:
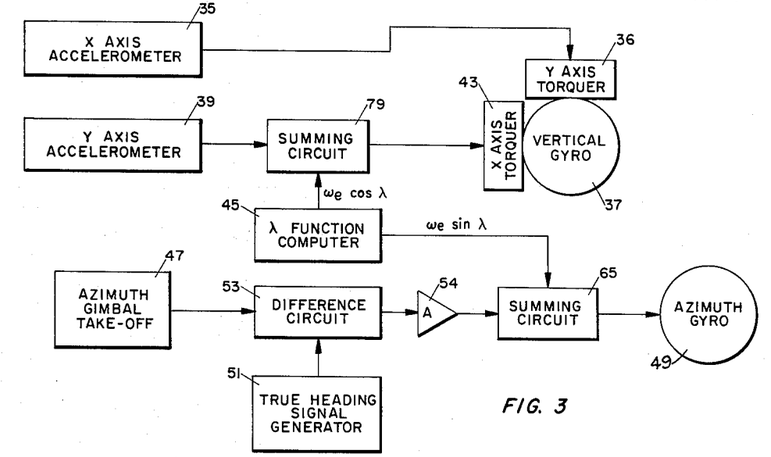
FIGS. 3–11 are block diagrams illustrating phases of operation of the system shown in FIG. 2.

The system for each of the phases of operation will now be described in more detail. FIGURE 3 is a block diagram illustrating the alignment loops for the gyros in the coarse alignment phase 17 used in both the flight align program 13 and the ground align program 15. In the coarse alignment phase 17, after the erection loops are closed, the output signal from the X axis accelerometer 35, as shown in FIGURE 3, energizes a torquer 36 of the vertical gyro 37. The torquer 36 applies a torque to the gyro 37 proportional to the signal applied from the accelerometer 35 to cause the vertical gyro 37 to pivot about the Y axis of the platform. The accelerometer 35, being stationary in the coarse alignment phase, will produce no output signal when the platform on which it is mounted is level, but when the platform is tilted about the Y axis the accelerometer 35 will sense a component of gravity and produce a corresponding output signal. In response to this output signal, the torquer 36 will cause the gyro 37 to pivot about the Y axis in a direction to reduce the tilt of the platform. Thus the tilt of the platform about the Y axis would be reduced until the accelerometer 35 produces no output signal, at which time the platform would no longer be tilted about the Y axis. The output signal from the Y axis accelerometer 39 is applied through a summing circuit 79 to a torquer 43 of the vertical gyro 37. The torquer 43, in response to the signal received from the summing circuit 79 will apply a torque to the vertical gyro 37 to cause it to pivot about the X axis. If the platform is not tilted about the X axis, the Y axis accelerometer 39, being stationary, will not produce any output signal. But when the platform is tilted about the X axis, the Y axis accelerometer 39 will sense a component of gravity and produce an output signal. In response to this output signal the torquer 43 will cause the vertical gyro 37 to pivot about the X axis in a direction to reduce the tilt. Thus the torquer 43 would continue to cause the gyro 37 to pivot about the X axis until the output signal from the accelerometer 39 became zero, at which time the platform would not be tilted about the X axis. Thus the torquers 36 and 43, in response to the output signals from the accelerometers 35 and 39 in the coarse alignment phase, cause the platform to rotate towards the position at which it is level. A latitude function computer 45 applies a signal representing $\omega e \cos \Lambda$ to the summing circuit 79, $\omega e$ being the earth's rate of rotation and $\Lambda$ being the latitude at which the aircraft carrying the system is located. In the summing circuit 79 this signal is added to the output signal from the Y axis accelerometer 39 and the sum of these two signals is applied to the torquer 43. The factor of the signal applied to the torquer 43 representing $\omega e \cos \Lambda$ serves to continuously rotate the platform about the X axis at a rate to correct the alignment of the platform for the earth's rate of rotation. The azimuth gimbal takeoff 47 generates an output signal which varies in accordance with the aircraft heading with respect to the azimuth gyro 49. If the azimuth gyro 49 is aligned with true north this output signal from the azimuth gimbal takeoff 47 will indicate the true heading of the aircraft with respect to north. In the coarse alignment phase the output signal from the azimuth gimbal takeoff 47 is applied to a difference circuit 53. A true heading signal generator 51 produces an output signal representing the true heading of the aircraft with respect to north. If the azimuth gyro 49 were aligned with true north, then the output signal produced by the true heading signal generator 51 would equal the output signal produced by the azimuth gimbal takeoff 47. The true heading signal is determined from magnetic north and the magnetic variation precisely known for the location of the aircraft where the coarse alignment is taking place. In the difference circuit 53 the output signal from the azimuth gimbal takeoff 47 is subtracted from the output signal of the true heading signal generator 51 and the difference circuit 53 produces an output signal representing the difference. This output signal is amplified by an amplifier 54 and applied to the azimuth gyro 49 through a summing circuit 65 to cause the azimuth gyro 49 to pivot in a direction to reduce the output signal of the difference circuit 53, or in other words towards true north. The azimuth gyro 49 would continue to pivot in response to the output signal from the difference circuit 53 until the output signal from the azimuth gimbal takeoff 47 became equal to the output signal from the true heading signal generator 51, at which time the output signal from the difference circuit 53 would be zero. A signal representing $\omega e \sin \Lambda$ is added to the output signal from the difference circuit 53 in the summing circuit 65 and then applied to the azimuth gyro 49. The factor in the output signal from the summing circuit 65 representing $\omega e \sin \Lambda$ will cause the platform to continuously rotate at a rate to correct the alignment of the azimuth gyro for the earth's rate of rotation.

As pointed out with respect to FIG. 2, the system preferably should remain in the coarse alignment phase for three minutes, although in the flight align program, the coarse alignment will automatically end when the aircraft begins to taxi. After three minutes the platform will be level within fifteen arc minutes and the azimuth will be aligned to north within approximately 0.5 degree.

*Undamped Schuler mode*

Figure 4:
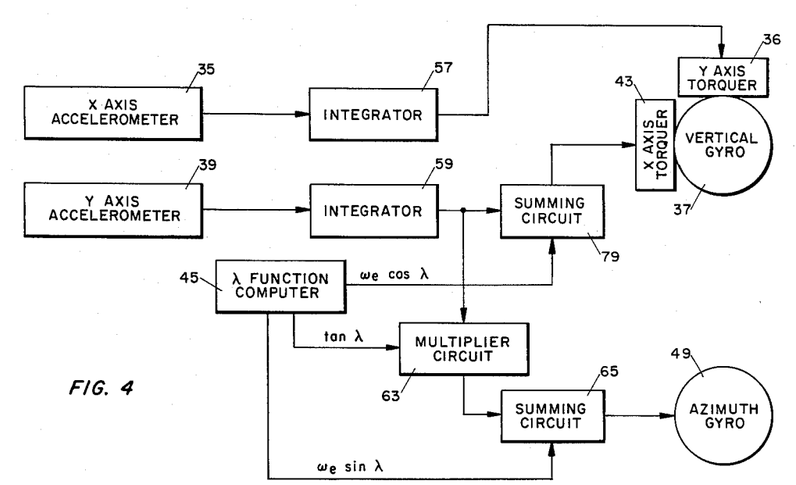

In the flight alignment program, when the aircraft begins to taxi for takeoff, the system is automatically switched to phase 19, in which the system operates in an undamped Schuler mode illustrated in block form in FIG. 4. As shown in FIGURE 4, the output signal from the X axis accelerometer 35 is integrated by an integrator 57, which produces an output signal representing the component of the aircraft velocity along the X axis of the platform. The output signal of the integrator 57 is fed to the torquer 36 of the vertical gyro 37. The torquer 36 will cause the gyro 37 to pivot about its Y axis at a rate proportional to the applied signal. As a result, the gyro 37 will pivot about the Y axis an amount proportional to the component of distance traveled by the aircraft along the X axis. The output signal from the Y axis accelerometer 39 is integrated by an integrator 59, which produces an output signal representing the component of aircraft velocity along the Y axis. This output signal is fed to the torquer 43 through the summing circuit 79. In response to this signal the torquer 43 will cause the gyro 37 to pivot about the X axis at a rate proportional to the applied signal. As a result the gyro 37 will pivot about the X axis an amount proportional to the component of distance traveled along the Y axis. The parameters of the system are selected so that the amount the platform pivots per distance traveled is just enough to account for the curvature of the earth so that the platform remains level. This type of operation is what is referred to as operating in the Schuler mode. If at the start of the operation in the Schuler mode the platform were level, then the platform would theoretically remain level. If, on the other hand, the platform were tilted about one or both of the X and Y axes, the platform would teeter os oscillate at a fixed frequency, which is known as the Schuler frequency, and the error in the level of the platform at the start of the Schuler operation would not increase with time. The latitude function computer 45 applies a signal representing $\omega e \cos \Lambda$ to the summing circuit 79, where this signal is added to the output signal from the integrator 59. The sum of these two signals is then applied to the torquer 43. The component in the output signal of the summing circuit 79 representing $\omega e \cos \Lambda$ will cause the gyro 37 to pivot about the X axis at a rate to correct the alignment of the vertical gyro for the earth's rate of rotation.

In the Schuler mode phase 19 illustrated in FIG. 4, the azimuth gyro 49 is north slaved by pivoting it about the Z axis at the meridian convergency rate, which is the rate that the true north direction rotates with respect to inertial space due to velocity in the east-west direction. The convergency rate equals the product of tan $\lambda$ and the velocity in the east-west direction. Accordingly, to generate a signal representing the meridian convergency rate, the output signal from the integrator 59, representing the velocity along the Y axis, is applied to a multiplier 63 where this signal is multiplied by a signal produced by the latitude function computer 45 representing tan $\Lambda$. As a result the multiplier circuit 63 produces an output signal proportional to the velocity along the Y axis times tan $\Lambda$ and this output signal represents the convergency rate. This signal is applied through the summing circuit 65 to the azimuth gyro 49, which in response thereto pivots about the Z axis at the convergency rate. The latitude function computer 45 produces a signal representing $\omega e \sin \Lambda$, which signal is added to the output signal of the multiplier circuit 63 in the summing circuit 65 and applied to the gyro 49. The component in the output signal of the summing circuit 65 representing $\omega e \sin \Lambda$ will cause the azimuth gyro 49 to pivot about the Z axis at a rate to correct the alignment of the azimuth gyro for the earth's rate of rotation.

*Flight fine level phase*

Figure 5:
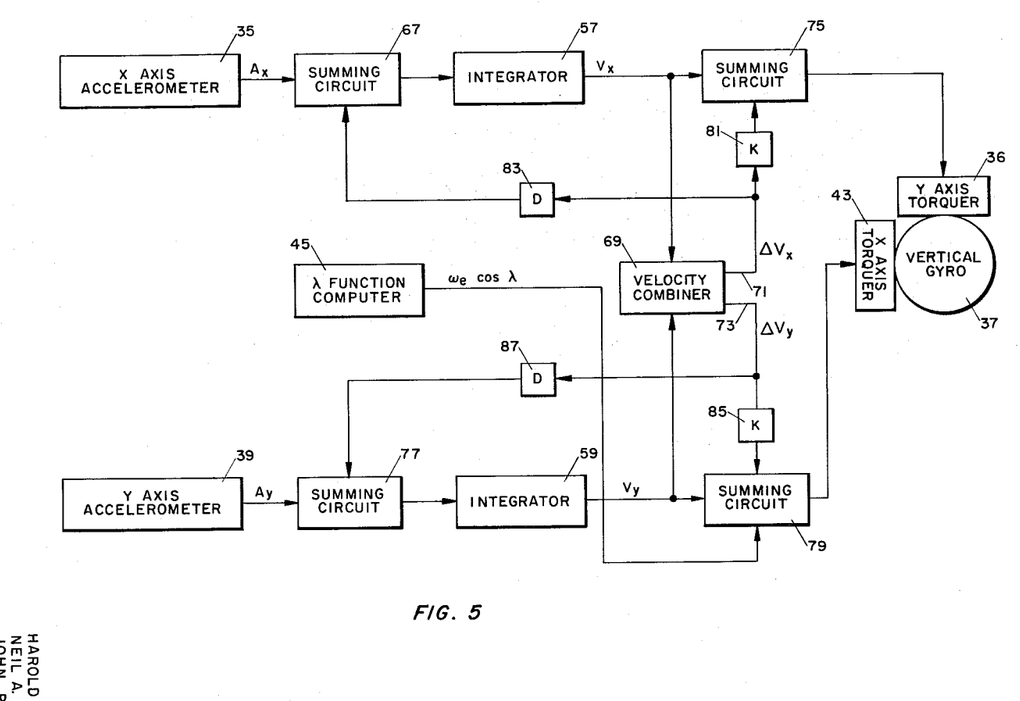

The system in the flight align program 13 will operate in the undamped Schuler mode as illustrated in FIG. 4 until the Doppler signal is received. In response to the Doppler signal the flight align program 13 will switch the system to operate in the flight fine level alignment phase 21, which is illustrated in the block diagram of FIG. 5. As shown in FIG. 5, the output signal of the X axis accelerometer 35 is applied through a summing circuit 67 to the input of the integrator 57, which, upon integrating the applied signal produces an output signal representing the velocity along the X axis. This output signal is applied through a summing circuit 75 to the torquer 36, which in response thereto causes the gyro 37 to pivot about the Y axis. Similarly, the output signal of the Y axis accelerometer 39 is applied to the input of the integrator 59 through a summing circuit 77. The integrator 59, upon integrating the applied signal, produces an output signal representing the velocity along the Y axis. This signal is applied to the torquer 43 through the summing circuit 79. The torquer 43, in response to this signal, will cause the gyro 37 to pivot about the X axis. The torquers 36 and 43, in response to the output signals from the integrators 57 and 59, tilt the gyro 37 in a direction to decrease the misalignment of the gyro 37 due to change in location on the earth's surface, but the inertial loops, instead of being tuned to the Schuler frequency, which would maintain the gyro 37 precisely aligned with vertical, are tuned to a multiple of the Schuler frequency. A multiple of the Schuler frequency is used becaues it will provide a good dynamic response. A system tuned to a multiple of the Schuler frequency is not dynamically exact unless, as in the present invention, the system is corrected by means of an external reference. The output signals from the integrators 57 and 59 representing the velocity along the X and Y axes respectively, are applied to a velocity combiner 69 where the velocities represented by these signals are compared with the velocity determined from the received Doppler signal. The velocity combiner 69 produces on an output 71 a signal which represents the difference between the velocity represented by the output of the integrator 57 and the velocity along the X axis determined from the Doppler signal. This difference in velocity is designated $\Delta Vx$. The velocity combiner 69 also produces a signal on an output 73 representing the difference in velocity represented by the output signal of the integrator 59 and the velocity along the Y axis determined from the Doppler signal. This difference in velocity is designated $\Delta Vy$. If the platform is not tilted about the Y axis, then the velocity represented by the output signal of the integrator 57 will equal the velocity along the X axis determined from the Doppler signal, and $\Delta Vx$ will be zero. Similarly, if the platform is not tilted about the Y axis, the velocity represented by the output signal of the integrator 59 will equal the velocity along the Y axis determined from the Doppler signal, and $\Delta Vy$ will be zero. Thus when the gyro 37 is correctly aligned with vertical $\Delta Vy$ and $\Delta Vx$ will be zero. The signal representing $\Delta Vx$ on output 71 is multiplied by a factor K in circuit 81, then combined with the output signal of the integrator 57 in the summing circuit 75, and then applied to the torquer 36, which in response to the component of the output signal of the summing circuit 75 representing $K\Delta Vx$ causes the vertical gyro 37 to pivot about the Y axis to reduce the tilt which gave rise to the signal representing $\Delta Vx$. The signal representing $\Delta Vx$ on output 71 is also multiplied in a circuit 83 by a factor D and then combined with the output signal of the accelerometer 35 in the summing circuit 67 and applied to the input of the integrator 57 to provide damping. The value of D is chosen so that damping is critical. In a similar manner to the signal representing $\Delta Vx$ on output 71, the signal representing $\Delta Vy$ on output 73 is used to correct the tilt about the X axis and provide critical damping by being multiplied by the factor K in a circuit 85 and being multiplied by factor D in a circuit 87. The output signal from the circuit 85 representing $K\Delta Vy$ is combined with the output signal from the integrator 59 in the summing circuit 79 and applied to the torquer 43 to reduce the tilt about the X axis and the output from the circuit 87 is combined with the output from the Y axis accelerometer 39 in the summing circuit 77 and applied to the input of the integrator 59 to provide critical damping. In this manner the error in the alignment of the vertical gyro is asymptotically reduced and the level of the platform is refined during flight. The control of the vertical gyro in this manner is referred to as operating in a damped Schuler mode.

The latitude function computer 45 generates a signal representing $\omega e \cos \Lambda$, which is combined with the outputs of the integrator 59 and the circuit 85 in the summing circuit 79 and applied to the torquer 43 to cause the gyro 37 to pivot about the X axis. This signal from the computer 45 is used to cause the gyro 37 to rotate about the X axis at a rate to correct the alignment of the vertical gyro for the earth's rate of rotation.

Figure 6:
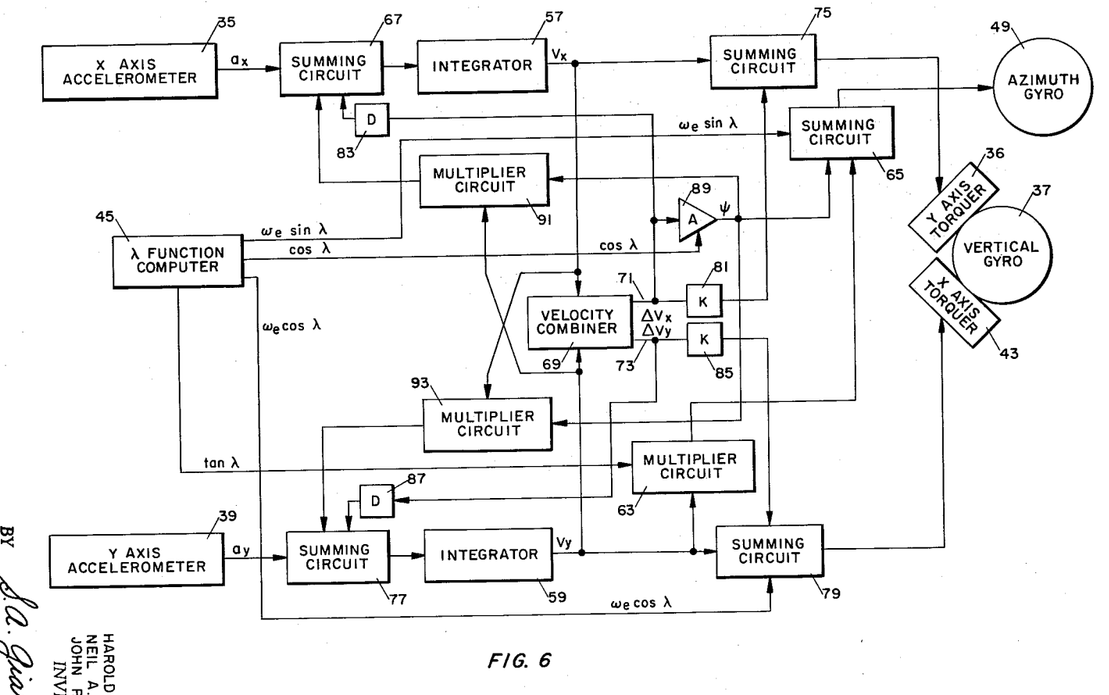

In the flight align program 13, the system remains in the phase 21 for a predetermined length of time and is then automatically switched to operate in the flight fine azimuth alignment phase 23, which is illustrated in block form in FIG. 6. This phase of operation is simply an extension of the leveling phase 21 and the system is the same as that illustrated in FIG. 5 with additional circuitry added. In the flight fine azimuth alignment phase 23 the azimuth gyro 49 will be controlled by gyrocompassing. The gyro-compassing is obtained by making use of the signal on output 71 representing $\Delta Vx$. In the coarse alignment phase 17 the system was aligned to the point where the X axis was positioned within one-half degree of true north. If the X axis were aligned precisely with north, $\Delta Xx$ would be zero. Since the X axis is slightly misaligned, the output signal from the integrator 57 is equal to the velocity along the X axis plus a component of the earth's rotation proportional to the misalignment angle, which is the angle between the X axis and true north. The initial output signal of the integrator 57 can be expressed mathematically as $Vx + R\omega e \cos \Lambda \sin \psi$ in which the $Vx$ is the velocity along the X axis, R is the radius of the earth, $\Lambda$ is the latitude, and $\psi$ is the misalignment angle between north and the X axis. If $\psi$ is a small angle, $\sin \psi$ is substantially equal to $\psi$ and the output signal representing $\Delta Vx$ on line 71 will be substantially proportional to the misalignment angle $\psi$. Accordingly the signal on output 71 is applied to an amplifier 89 to provide a signal representing $\psi$. It will be seen from the formula mathematically expressing the output signal of the integrator 57 that the signal on output 71 will be proportional not only to $\psi$ but also to $\cos \Lambda$. In order to eliminate the dependence of the output signal of the amplifier 89 on the variable $\cos \Lambda$, the amplifier 89 has a variable gain. The variable gain is controlled by a signal proportional to $\cos \Lambda$ applied from the latitude function computer 45 so that the gain of the amplifier 89 is proportional to the reciprocal of $\cos \Lambda$. As a result the output of the amplifier 89 will not be dependent upon any variable factor other than $\psi$ and therefore can correctly represent $\psi$. The output signal of the amplifier 89 is applied through the summing circuit 65 to the azimuth gyro 49 to cause the azimuth gyro 49 to pivot in a direction to reduce the misalignment angle $\psi$, which gives rise to the output signal from the amplifier 89. In this manner the azimuth gyro is gyrocompressed to true north. When this gyrocompassing loop is closed, $\psi$ becomes a function of time and the output of amplifier 89 is proportional to $\dot\psi$, which is the rate of change of $\psi$, as well as to $\psi$. Because the gyrocompassing is carried out on a moving base, the accelerometers 35 and 39 each sense a component of acceleration equal to the product of the velocity and the platform precession due to azimuth alignment. The acceleration components felt by the X and Y accelerometers 35 and 39 are respectively the velocity along the Y axis times $\dot{\psi}$ and the velocity along the X axis times $\dot{\psi}$. Accordingly, correction signals should be combined with the signals applied to the inputs of the integrators 57 and 59 to cancel out these errors in the output signals from the accelerometers 35 and 39. Otherwise the characteristic equation describing the gyrocompassing procedure would have a coefficient depending upon the magnitude and direction of velocity. This coefficient could become extremely small and, in the worst case, negative. When this condition occurred, the system would become unstable. To provide the necessary correction signals, the output signal from the amplifier 89 is applied to multiplier circuits 91 and 93. The output signal from the integrator 59 is also applied to the multiplier circuit 91 where it is multiplied with the output signal of the amplifier 89. As a result the multiplier circuit 91 produces an output signal representing $\psi$ times the velocity along the Y axis. This signal is combined with the output of the X axis accelerometer 35 in the summing circuit 67 to cancel out the component in the output signal of the accelerometer 35 caused by the gyrocompassing operation. The output signal of the integrator 57 is multiplied with the output signal of the amplifier 89 in the multiplier 93, which produces an output signal representing $\dot{\psi}$ times the velocity along the X axis. The output signal of the multiplier 93 is combined with the output signal of the Y axis accelerometer 39 to cancel out the component in the output signal of the accelerometer 39 caused by the gyrocompassing operation. The latitude function computer 45 generates a signal representing $\omega e \sin \Lambda$, which signal is additively combined with the output signal of the amplifier 89 in the summing circuit 65 and applied to the azimuth gyro 49. This output signal of the latitude function computer will cause the azimuth gyro 49 to pivot about the Z axis at a rate to correct the alignment of the azimuth gyro for the earth's rate of rotation. The latitude function computer 45 also generates a signal representing tan $\Lambda$, which signal is multiplied with the output of the integrator 59 in a multiplier circuit 63. The resulting output signal of the multiplier circuit 63 is combined with the output signal of the amplifier 89 in the summing circuit 65 and applied to the azimuth gyro 49. The output signal of the multiplier circuit 63 causes the azimuth gyro to pivot about the Z axis at the meridian convergency rate.

About one-half hour after Doppler signal is first received the system will reach a steady state. The system will then continue to operate in the gyrocompassing mode illustrated in FIG. 6 providing accurate navigational information.

Figure 7:
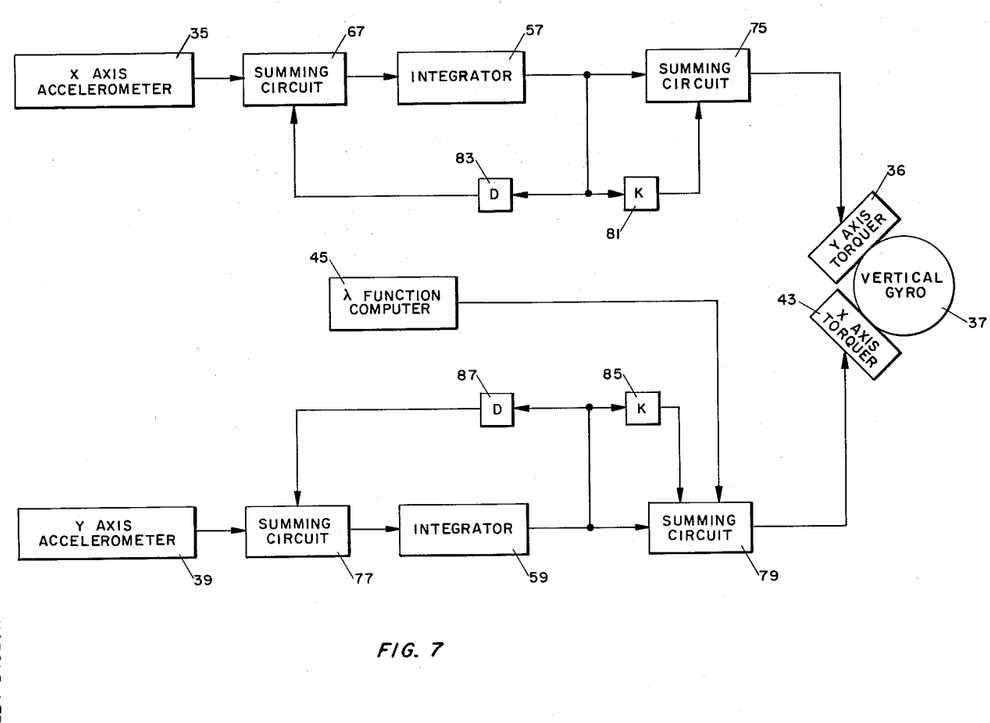

When the ground align program 15 is selected, after the coarse alignment phase 17 has been completed, the system is switched to operate in the ground fine level alignment phase 25, which is illustrated in block form in FIG. 7. The ground fine level alignment phase 25 is similar to the flight fine level alignment phase 21, except that there is no Doppler signal. However, the velocity is known to be zero, and this knowledge provides the reference provided by the Doppler signal in the flight fine level alignment phase 21. As in the phase 21, the outputs of the accelerometers 35 and 39 are applied to the integrators 57 and 59 through the summing circuits 67 and 77 respectively. The resulting output signals from the integrators 57 and 59 are applied to the torquers 36 and 43 through the summing circuits 75 and 79 to pivot the vertical gyro 37 in the same manner as in the phase 21. As in the phase 21, the inertial loops for the vertical gyro 37 are tuned to a multiple of the Schuler frequency. Since the true velocity is zero the output signal of the integrator 57 itself represents the difference between the velocity along the X axis and the velocity represented by this output signal. Thus the output of the integrator 57 represents $\Delta Vx$. Similarly, the output of the integrator 59 represents $\Delta Vy$. Therefore the output signal of the integrator 57 is fed directly to the circuits 81 and 83, where this signal is multiplied by the factors K and D respectively. Similarly, the output signal of the integrator 59 is fed directly to the circuits 85 and 87, where it also is multiplied by the factors K and D respectively. As in phase 21, the output signals of the circuits 81 and 85 are combined with the outputs of the integrators 57 and 59 in the summing circuits 75 and 79 and fed to the torquers 36 and 43 respectively to reduce the tilt of the vertical gyro which gives rise to the output signals of the integrators 57 and 59. The output signals of the circuits 83 and 87, as in phase 21, are combined with the output signals of the accelerometers 35 and 39 in the summing circuits 67 and 77 to provide critical damping. Thus in this phase the system operates in a damped Schuler mode. The latitude function computer 45 applies a signal representing $\omega e \cos \Lambda$ to the summing circuit 79 where it is combined with the output signals of the intergrator 59 and the circuit 85 and applied to the torquer 43 to cause the vertical gyro 37 to pivot about the X axis at a rate to correct for the earth's rate of rotation.

Figure 8:
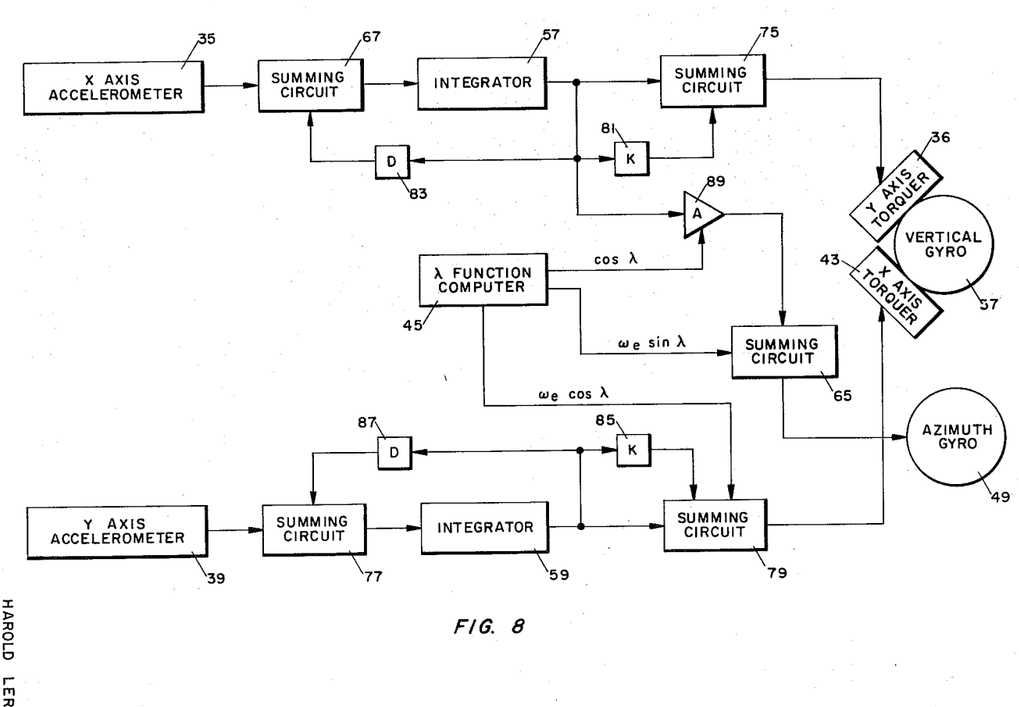

The ground fine leveling phase 25 continues in the ground align program 15 for four minutes, after which time the ground align program 15 automatically switches the system to the ground fine azimuth alignment phase 27, which is shown in block form in FIG. 8. The ground fine azimuth alignment phase 27 is an extension of the fine leveling alignment phase 25 and makes use of the same circuitry as the phase 25 with circuitry added for gyrocompassing. Since the output of the integrator 57 will represent $\Delta Vx$, this signal will again be proportional to cos $\Lambda$ times the misalignment angle. Accordingly, the output signal of the integrator 57 is fed directly to the input of the variable gain amplifier 89, the gain of which is controlled by the signal applied from the latitude function computer 45 to be proportional to the reciprocal of cos $\Lambda$. As a result, the output signal of the amplifier 89 will not be dependent upon the latitude and will represent $\psi$. This output signal from the amplifier 89 representing $\psi$, the misalignment angle, is applied through the summing circuit 65 to the azimuth gyro 49 to pivot it about the Z axis to reduce the misalignment angle. The latitude function computer 45 generates a signal representing $\omega e \sin \Lambda$ which is combined with the output signal of the amplifier 89 in the summing circuit 65 and applied to azimuth gyro 49 to cause it to pivot about the Z axis at a rate to correct for the earth's rate of rotatiton. The system when operating in the ground align program remains in the ground fine azimuth alignment phase 27 for eight minutes.

Figure 9:
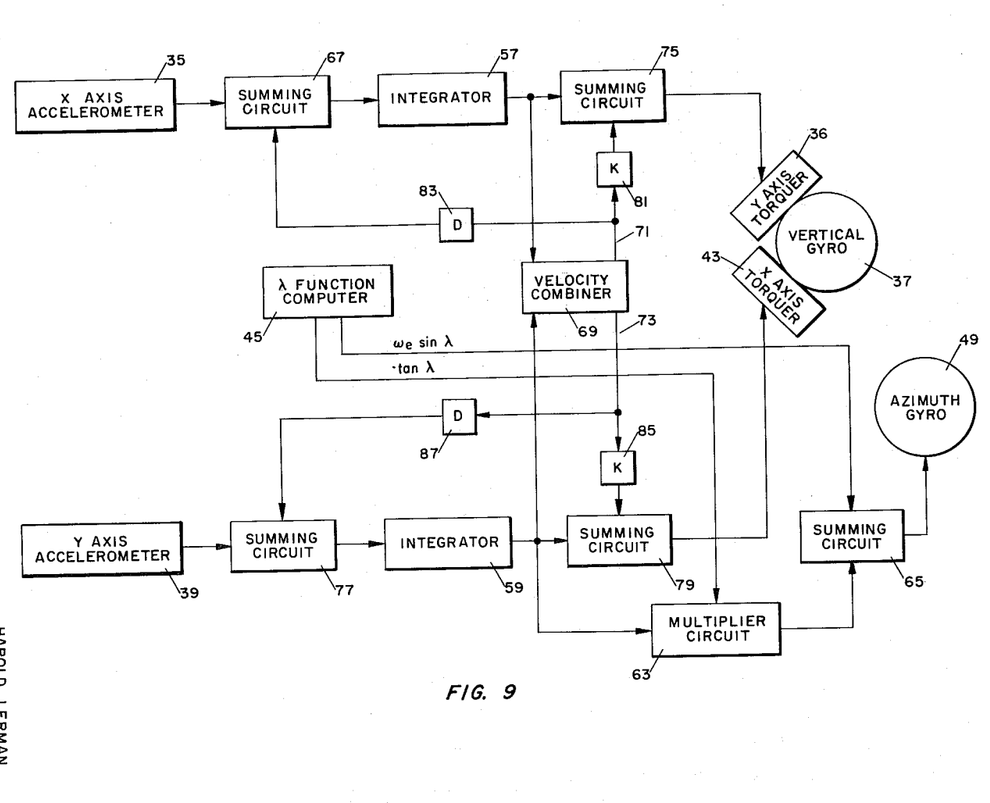

After the ground fine alignment phase 27 in the ground align program 15, the system is ready for takeoff, at which time the system automatically switches to operate in the undamped Schuler mode phase 19, which was described with reference to FIG. 4. Upon receiving a Doppler signal, the system is automatically switched to operate in the phase 29, in which the system operates in a damped Schuler mode which is north slaved. This phase is illustrated in FIG. 9. As shown in FIG. 9, the output signal from the X axis accelerometer 35 is applied to the input of the integrator 57 through the summing circuit 67. The integrator 57 integrates the signal applied to its input and produces on its output a signal representing the velocity along the X axis. This output signal from the integrator 57 is applied through the summing circuit 75 to the torquer 36 of the vertical gyro 37. The output signal from the Y axis accelerometer 39 is applied through the summing circuit 77 to the input of the integrator 59, which integrates the signal applied to its input and produces an output signal representing the velocity along the Y axis. This output signal of the integrator 59 is applied through the summing circuit 79 to the torquer 43 of the vertical gyro 37. In response to the signals applied from the summing circuits 79 and 75, the torquers 43 and 36 cause the gyro 37 to pivot about its X and Y axes respectively to maintain the vertical gyro 37 aligned with vertical. The inertial loops for the gyro 37 are tuned to a multiple of the Schuler frequency. The output signals from the integrators 57 and 59 are applied to the velocity combiner 69. The velocity combiner 69 compares the velocity represented by these two output signals from the integrators 57 and 59 with the velocity determined from the received Doppler signal and produces a signal on output 71 representing $\Delta Vx$, the difference between the velocity represented by the output signal of the integrator 57 and the velocity along the X axis determined from the Doppler signal, and an output 73 a signal representing $\Delta Vy$, the difference between the velocity represented by the output signal of the integrator 59 and the velocity along the Y axis determined from the Doppler signal. The output signal representing $\Delta Vx$ is multiplied by the factor K in circuit 81, combined with the output signal of the integrator 57 in the summing circuit 75, and applied to the torquer 36 to reduce the tilt of the gyro 37 about the Y axis, which tilt gave rise to the signal representing $\Delta Vx$. The signal representing $\Delta Vx$ on output 71 is also multiplied times the factor D in the circuit 83 and combined with the output signal of the X axis accelerometer 35 in the summing circuit 67 to provide critical damping. The signal on output 73 representing $\Delta Vy$ is multiplied in a circuit 85 times the factor K, combined with the output of the integrator 59 in the summing circuit 79, and applied to the torquer 43 to correct the tilt of the vertical gyro 37 about the X axis, which tilt gave rise to the signal representing $\Delta Vy$ on output 73. The signal on output 73 is also applied to the circuit 87 in which it is multiplied by the factor D and then combined with the output of the accelerometer 39 in the summing circuit 77 to provide critical damping. Thus a damped Schuler mode of operation is provided. The output signal of the integrator 59 representing the velocity along the Y axis is applied to the multiplier circuit 63, where it is multiplied by a signal representing tan $\Lambda$, generated by the latitude function computer 45. The output signal of the multiplier circuit 63 is applied through the summing circuit 65 to the azimuth gyro 49 to pivot the gyro 49 about the Z axis at the meridian convergency rate. The latitude function computer 45 generates a signal representing $\omega e \sin \Lambda$ which is combined with the output of the multipler circuit 63 in the summing circuit 65 and applied to the azimuth gyro 49 to cause it to pivot at a rate to correct for the earth's rate of rotation. Thus a north slaved damped Schuler operation is provided. The system will remain in this mode of operation and will continuously give accurate navigational information.

Figure 10:
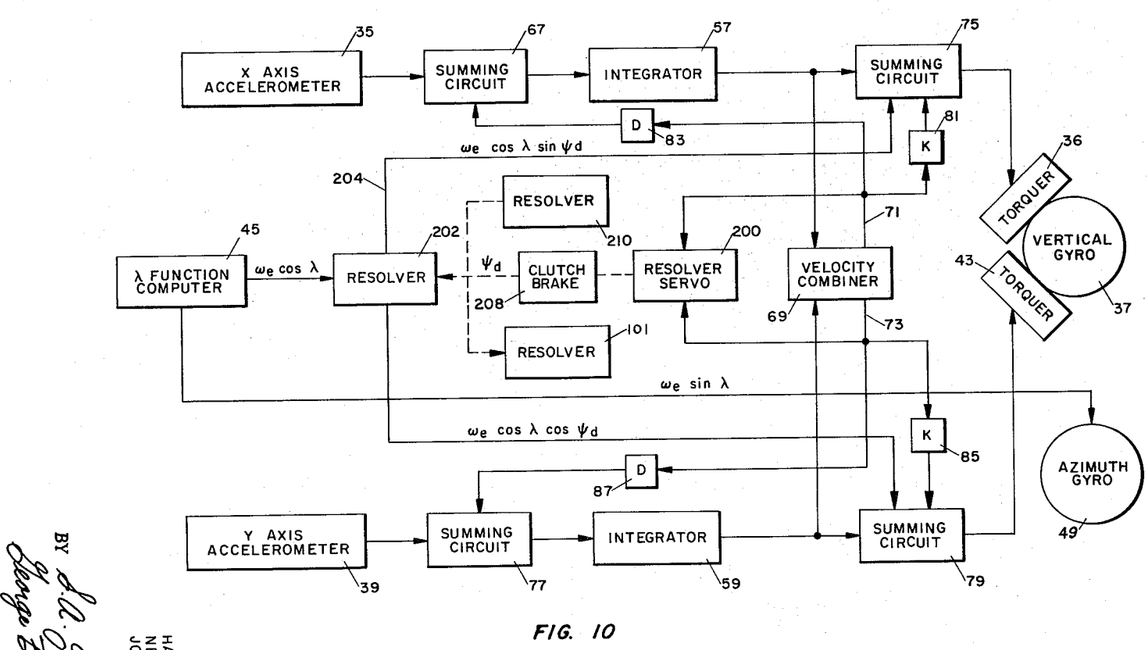

As pointed out above with reference to FIG. 2, the pilot may switch from either the flight align program 13 or the ground align program 15 to operate in the grid mode 31, which is illustrated in block form in FIG. 10. As shown in FIG. 10, the output of the X axis accelerometer 35, after passing through the summing circuit 67, is integrated in the integrator 57, which produces an output signal representing the velocity along the X axis. The output signal of the integrator 57 is fed through the summing circuit 75 to the torquer 36 of the vertical gyro 37. The output signal of the Y axis accelerometer 39, after passing through the summing circuit 77, is integrated by the integrator 59, which produces an output signal representing the velocity along the Y axis. The output signal of the integrator 59 is fed through the summing circuit 79 to the torquer 43 of the gyro 37. The torquers 36 and 43 cause the gyro 37 to pivot about the Y and X axes, respectively. The inertial loops of the gyro 37 are tuned to a multiple of the Schuler frequency so that the vertical gyro is maintained aligned with vertical. The output signal of the integrator 57 is fed to the velocity combiner 69 as is the output signal of the integrator 59. The velocity combiner 69 compares the velocities represented by the output signals of the integrators 57 and 59 with the velocity determined from the Doppler signal. It produces on the output 71 a signal representing $\Delta Vx$, the difference between the velocity represented by the output signal of the integrator 57 and the velocity along the X axis as determined from the Doppler signal, and on output 73 a signal representing $\Delta Vy$, the difference in the velocity represented by the output of the integrator 59 and the velocity along the Y axis determined from the Doppler signal. The signal on output 71 is multiplied in circuit 81 times the factor K, combined with the output of the integrator 57 in the summing circuit 75, and applied to the torquer 36 to correct the alignment of the vertical gyro 37 about the Y axis. In a similar manner, the signal on output 73 representing $\Delta Vy$ is multiplied in the circuit 85 by the factor K, combined with the output of the integrator 59 in the summing circuit 79, and applied to the torquer 43 to correct the alignment of the gyro 37 about the X axis. The signals on outputs 71 and 73 are also fed to the circuits 83 and 87, respectively, where they are multiplied by the factor D and then combined with the outputs of the accelerometers 35 and 39 in the summing circuits 67 and 77, respectively, to provide critical damping. Thus the system is operated in a damped Schuler mode. The azimuth gyro, in this mode, is not maintained aligned with true north, and accordingly is not controlled by gyrocompassing as in the phase 23 or by computed torquing rates as in the phase 29. The azimuth gyro is fed only a signal from the latitude function computer 45 proportional to $\omega e \sin \Lambda$ to cause the azimuth gyro to rotate about the Z axis at a rate to correct the alignment for the earth's rate of rotation. Accordingly, in the grid mode of operation, the azimuth gyro and the X axis will drift from true north. Because the X axis does not remain aligned with true north during the grid mode of operation, the output signals of the integrators 57 and 59 will not actually be proportional to the velocities along the X and Y axes alone, but will be proportional to these velocities plus components of the earth's rate of rotation. The output signal from the integrator 57 can be represented by the formula $Vx + R\omega e \cos \Lambda \sin \psi d$ in which $\psi d$ is the angle between the axis and north through which the X axis has drifted during the grid mode of operation. The output signal of the integrator 59 can be represented by the formula $Vy + R\omega e \cos \Lambda \cos \psi d$. Since the output signals on lines 71 and 73 represent the difference between the velocities $Vx$ and $Vy$ determined from the Doppler signal and the velocities represented by the output signals of the integrators 57 and 59, respectively, the output signal on line 71 will be proportional to $\cos \Lambda \sin \psi d$ and the output signal on line 73 will be proportional to $\cos \Lambda \cos \psi d$. These signals on lines 71 and 73 are fed to a resolver servo 200 which positions an output shaft at the angle $\psi d$. The output shaft of the resolver servo 200 drives a clutch brake 208 which drives the input shaft of resolvers 101, 202 and 210. The clutch brake 208 selectively couples the input shafts of the resolvers 101, 202 and 210 to the output shaft of the resolver servo 200 or locks the input shafts of these resolvers in the positions that they are in. During the grid mode of operation, the clutch brake 208 couples the input shafts of the resolvers 101, 202 and 210 to the output shaft of the resolver servo 200 so that the input shafts of the resolvers 101, 202 and 210 are positioned at the angle $\psi d$ during the grid mode of operation. The resolver 202 receives a signal from the latitude function computer 45 representing $\omega e \cos \Lambda$. In response to its input shaft being positioned at the angle $\psi d$ and in response to the applied signal representing $\omega e \cos \Lambda$, the resolver 202 produces a signal on a channel 204 representing $\omega e \cos \Lambda \sin \psi d$ and on line 206 a signal representing $\omega e \cos \Lambda \cos \psi d$. The signals on lines 204 and 206 are fed through the summing circuits 75 and 79 to the torquers 36 and 43 to correct the alignment of the vertical gyro 37 for the earth's rate of rotation. The reason for the clutch brake 208 and the resolvers 101 and 210 will become apparent when the offset gyrocompass phase 33 is explained below.

*Offset gyrocompass flight*

Figure 11:
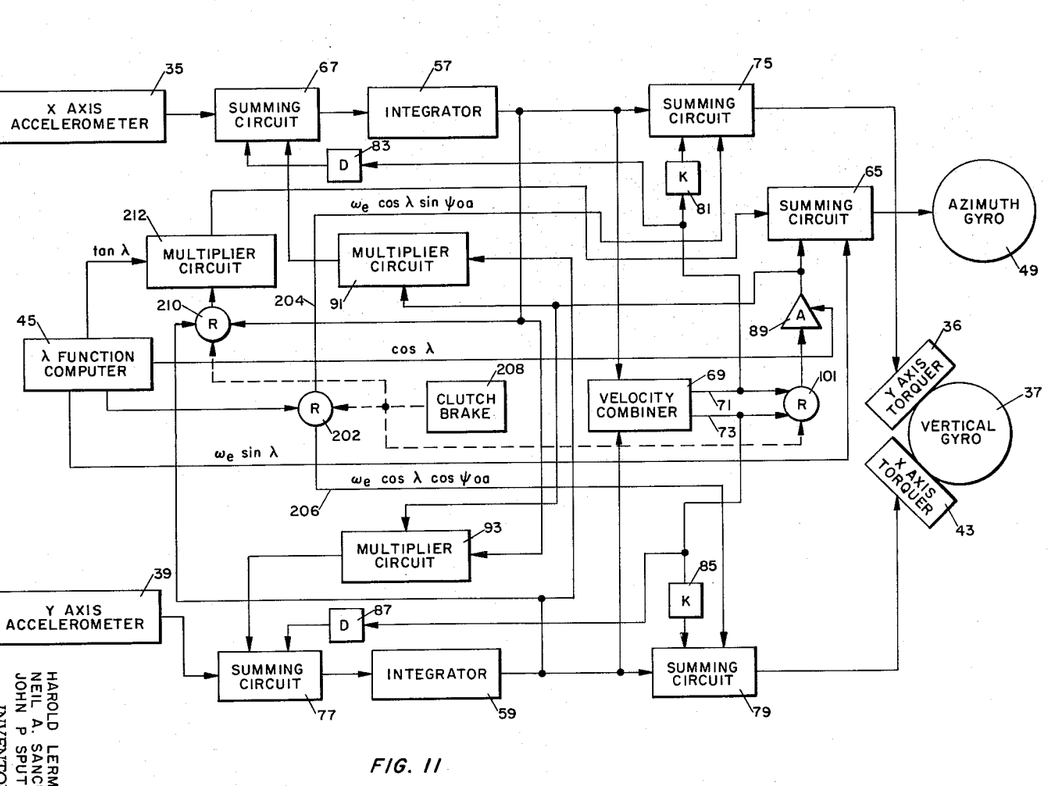

If after operating in the grid mode the pilot wishes to return to gyrocompassed operation, he can switch the system to operate in the offset gyrocompass flight mode 33, which is illustrated in block form in FIG. 11. In this mode of operation the azimuth gyro is gyrocompassed to the angle offset from north through which the azimuth gyro has drifted during the grid mode of operation. As pointed out above, the angle through which the azimuth gyro drifts during the grid mode of operation is determined by the resolver servo 200 (FIG. 10). On switching to the offset gyrocompass flight mode 33, the clutch brake 208 uncouples the input shafts of the resolvers 101, 202 and 210 from the output shaft of the resolver servo 200 and locks the input shafts of the resolvers 101, 202 and 210 in the position that they are in. The input shaft of the resolvers 101, 202 and 210 will therefore be locked at the angle between north and the X axis, through which the azimuth gyro and the X axis drifted during the grid mode of operation. During the offset gyrocompassing mode of operation, the azimuth gyro will be gyrocompassed to this angle offset from north. This offset angle shall be designated $\psi oa$. The output of the X axis accelerometer 35 is fed through the summing circuit 67 and integrated by the integrator 57, which produces an output signal representing the velocity along the X axis. The output signal of the Y axis accelerometer is fed through the summing circuit 77 to the integrator 59, which produces an output signal representing the velocity along the Y axis. The output signals from the integrators 57 and 59 are fed through summing circuits 75 and 79 to the torques 36 and 43 respectively of the vertical gyro 37. The torquers 36 and 43 cause the gyro to pivot about its Y and X axes respectively and the intertial loops for the vertical gyro 37 are tuned to a multiple of the Schuler frequency. The output from the integrator 57 and the output from the integrator 59 are fed to the velocity combiner 69, which in response thereto produces signals on outputs 71 and 73 representing $\Delta Vx$ and $\Delta Vy$ respectively. The signal on output 71 representing $\Delta Vx$ is multiplied by the factor K in circuit 81, combined with the output of the integrator 57 in the summing circuit 75, and applied to the torquer 36 of the vertical gyro 37 to correct the alignment of the vertical gyro about the Y axis. Similarly, the signal on output 73 representing $\Delta Vy$ is multiplied by the factor K in the circuit 85, combined with the output of the integrator 59 in the summing circuit 79, and applied to the torquer 43 to cause the gyro 37 to pivot about the X axis to correct the alignment of the gyro 37 about the X axis. The signals on outputs 71 and 73 are multiplied by the factor D in circuits 83 and 87 respectively and combined with the outputs of accelerometers 35 and 39 in the summing circuits 67 and 77 to provide critical damping. Thus the vertical gyro 37 is controlled to be aligned with vertical in a damped Schuler mode.

The azimuth gyro 49 in this mode of operation is gyrocompassed to the offset heading angle $\psi oa$ through which the azimuth gyro has drifted during the grid mode of operation. This angle is represented by the angular position of the output shaft of the clutch brake 208. When the system is switched to operate from the grid mode to the offset gyrocompass flight mode, the output shaft of the clutch brake 208 is locked in its angular position to preserve the offset heading angle. The clutch brake 208 locks the input shaft of the resolver 101 at the angle $\psi oa$. The signals on lines 71 and 73 representing $\Delta Vx$ and $\Delta Vy$ respectively are fed during the offset gyrocompass flight mode to the resolver 101. The resolver 101 resolves the velocities $\Delta Vx$ and $\Delta Vy$ into a velocity in the true north direction and therefore generates an output signal which is proportional to this velocity. This signal will be proportional to the alignment error between the azimuth gyro and the offset angle $\psi oa$ from north. The angle of this alignment error is designated $\psi e$. The signal output of the resolver 101 will also be proportional to $\cos \Lambda$ and accordingly this output signal is amplified by the variable gain amplifier 89, the gain of which is controlled by a signal from the latitude function computer 45 to be proportional to the reciprocal of $\cos \Lambda$. Thus the output signal of the amplifier 89 is not dependent upon the latitude and accordingly will represent the alignment error $\psi e$ of the azimuth gyro 49. The output signal of the amplifier 89 is fed through the summing circuit 65 to the azimuth gyro 49 to reduce the alignment error $\psi e$ which gave rise to the output signal of the amplifier 89.

The latitude function computer 45 applies a signal representing $\omega e \cos \Lambda$ to the resolver 202, the input shaft of which is locked at the angle $\psi oa$ by the clutch brake 208. The resolver 202, in response to the signal applied from the latitude function computer 45 and its input shaft position produces an output signal on channel 204 representing $\omega e \cos \Lambda \sin \psi oa$ and an output signal on channel 206 representing $\omega e \cos \Lambda \cos \psi oa$. The signal on channel 204 is applied through the summing circuit 75 to the torquer 36 to correct the alignment of the vertical gyro 37 about the Y axis for the earth's rate of rotation. The signal on channel 206 is fed through the summing circuit 79 to the torquer 43 to correct the alignment of the vestical gyro 37 about the X axis for the earth's rate of rotation.

The clutch brake 208 also locks the input shaft of the resolver 210 at the angle $\psi oa$. In the offset gyrocompassing flight mode, the output signals of the integrators 57 and 59 are fed to the resolver 210. The resolver 210 resolves the velocities represented by the output signals applied thereto through the angle $\psi oa$ to produce an output signal representing velocity in the east-west direction. This signal is applied to a multiplier circuit 212 which also receives a signal from the latitude function computer 45 representing $\tan \Lambda$. The multiplier circuit 212 multiplies the two applied signals and produces an output signal representing the meridian convergency rate. The output signal of the mutliplier circuit 212 is combined with the output signal of the amplifier 89 in the summing circuit 65 to provide the meridian convergency rate correction for the azimuth gyro 49.

The latitude function computer 45 also applies a signal representing $\omega e \sin \Lambda$ to the summing circuit 65 to provide the correction of the azimuth gyro for the earth's rate of rotation.

Once the gyrocompassing loop is closed in the offset gyprocompass flight mode, the output signal of the amplifier 89 will represent $\dot{\psi}e$, which is the rate of change of $\psi e$, as well as $\psi e$. The output of the amplifier 89 is fed to the multiplier circuit 91 where it is multiplied with the output signal of the integrator 59 representing the velocity along the Y axis. The output of the mutliplier 91, reprsenting the product of velocity along the Y axis and $\dot{\psi}e$, is combined with the output of the accelerometer 35 in the summing circiut 67. The output of the amplifier 89 is also fed to the multiplier circiut 93, where this output signal is mutliplied by the output signal of the integrator 57 representing velocity along the X axis. The output signal of the multiplier 93, representing the product of the two applied input signals, is combined with the output of the accelerometer 39 in the summing circuit 77.

The mutlipliers 91 and 93 in this manner provide the correction for the errors resulting from the gyrocompassing of the azimuth gyro 49.

In each of the operational phases 19, 21, 23, 25, 27, 29, 31 and 33 illustrated in FIGS. 4 through 11, the usual accelerometer corrections are provided by additively combining correction signals with the output signals of the accelerometer. Since these correction signals do not form part of the invention, they have not been included in the description of the invention or in the drawings.

Figure 12:
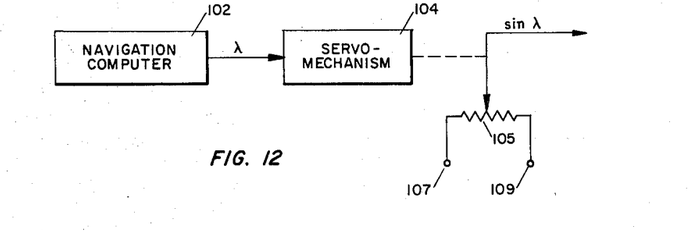
FIGS. 12 and 13 illustrate block diagrams of components of the system.

FIG. 12 illustrates how the latitude function computer 45 generates the signal representing $\omega e \sin \Lambda$. A navigation computer 102 feeds a signal representing the latitude $\Lambda$ to a servomechanism 104 which positions the movable contact of a potentiometer 105 at a position proportional to the latitude $\Lambda$. A voltage is applied across a pair of terminals 107 and 109 connected to opposite ends of the potentiometer 105. The resistance of the potentiometer 105 is made to vary in such a manner that the output voltage produced at the movable contact is proportional to the sin $\Lambda$. The other trigonometric functions produced by the latitude function computer 45 can be produced in a similar manner.

Figure 13:
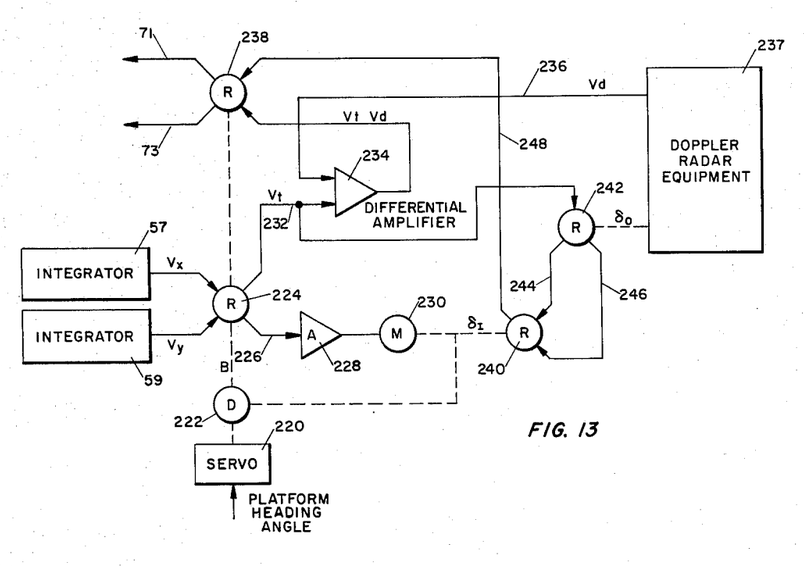
Figure 14:
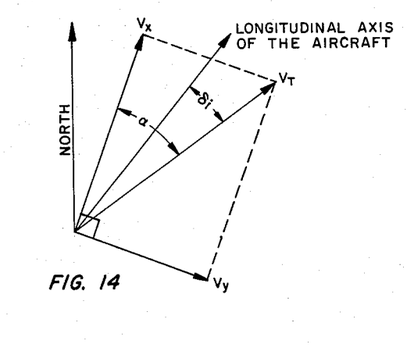
FIG. 14 is a vector diagram provided to assist in the explanation of the system.

FIG. 13 shows a schematic diagram of the velocity combiner 69. As shown in FIG. 13, the signal representing the platform heading angle, which is the angle between the longitudinal axis of the aircraft and the X axis of the platform, is fed to a servomechanism 220. The servomechanism 220 positions an output shaft at the platform heading angle. The output shaft of the servomechanism is coupled to one input shaft of a mechanical differential 222. The differential 222 has another input shaft and an output shaft, and it positions its output shaft at an angle equal to the difference between the angles at which its input shafts are positioned. The output shaft of the differential 222 is coupled to the input shaft of a resolver 224, to which the output signals of the integrators 57 and 59, representing $Vx$ and $Vy$, are fed. The resolver produces on an output channel 226 a signal representing $Vx$ times the sine of its input shaft position minus $Vy$ times the cosine of its input shaft position. When the input shaft position of the resolver 224 is at the angle between the X axis and the direction of the total inertially derived velocity indicated by $Vx$ and $Vy$, the output signal produced by the resolver 224 on channel 226 will be 0. For a better understanding of this principle, reference is made to the vector diagram in FIG. 14. In FIG. 14 the total inertially derived velocity, which is the vector sum of $Vx$ and $Vy$, is designated as $Vt$, and the angle between $Vx$ and $Vt$ is designated $\alpha$. It will be seen that $Vx \sin \alpha - Vy \cos \alpha = 0$. Therefore when the input shaft of the resolver 224 is positioned at $\alpha$, the output signal on the channel 226 will represent $Vx \sin \alpha - Vy \cos \alpha$ and will be 0. The output signal on channel 226 is amplified by an amplifier 228 and drives a motor 230 which drives the other input shaft of the differential 222. A signal on channel 226 will cause the other input shaft of the differential 222 to rotate, which in turn will cause the input shaft of the resolver 224 to rotate until the signal on the channel 226 becomes 0, at which time the input shaft of the resolver 224 will be positioned at the angle $\alpha$. Thus in this manner the input shaft of the resolver 224 is maintained at the angle $\alpha$. The resolver 224 produces on an output channel 232 a signal representing $Vx \cos \alpha + Vy \sin \alpha$, which equals $Vt$. This signal on channel 232 representing $Vt$ is fed to one of the inputs of a differential amplifier 234. The Doppler radar equipment designated 237 produces a signal representing the total velocity derived from the Doppler signal on a channel 236. This signal representing the total velocity derived from the Doppler signal is designated $Vd$. The signal representing $Vd$ on channel 236 is fed to the other input of the differential amplifier 234 which produces an output signal representing the difference between $Vd$ and $Vt$. This output signal of the differential amplifier 234 is fed to one of the inputs of a resolver 238.

The angle between $Vt$ and the longitudinal axis of the aircraft is referred to as the inertially derived drift angle. This angle as shown in FIG. 14 is designated $\delta i$. It will be noted that the heading angle minus $\delta i$ equals $\alpha$. Thus since the servo 220 positions one input shaft of the differential 222 at the heading angle and since the output shaft of the differential 222 is positioned at $\alpha$, the other input shaft of the differential 222 positioned by the motor 230 will be at $\delta i$. Thus the output shaft of the motor 230 is positioned at the inertially derived drift angle $\delta i$. The output shaft of the motor 230 is coupled to the input shaft of a resolver 240 to position the input shaft of the resolver 240 at $\delta i$. The output signal on channel 232 representing $Vt$ is fed to a resolver 242, the input shaft of which is positioned at the Doppler drift angle by means of the Doppler radar equipment 237. The Doppler drift angle, which is designated $\delta d$, is the angle between $Vd$ and the longitudinal axis of the aircraft. The resolver 242 produces an output signal on a channel 244 representing $Vt \sin \delta d$ and a signal on channel 246 representing $Vt \cos \delta d$. The signals on channels 244 and 246 are fed to the resolver 240 which produces on an output channel 248 a signal representing $Vt \sin \delta d \cos \delta i - Vt \cos \delta d \sin \delta i$ which equals $Vt \sin (\delta d - \delta i)$. In other words, the signal produced on channel 248 is the total inertial velocity times the sine of the difference between the Doppler drift angle and the inertially derived drift angle. This value is referred to as the cross track velocity and is fed to another input of the resolver 238. This cross track velocity is designed $Vct$. The input shaft of the resolver 238 is coupled to the output shaft of the differential 222 and accordingly is positioned at $\alpha$. The resolver 238 produces an output signal on the channel 71 representing $(Vt - Vd) \cos \alpha + Vct \sin \alpha$. This quantity equals $\Delta Vx$. The resolver 238 produces on the channel 73 a signal representing $-(Vt - Vd) \sin \alpha + Vct \cos \alpha$. This quantity equals $\Delta Vy$. In this manner the resolver 238 produces the signals representing $\Delta Vx$ and $\Delta Vy$ on the channels 71 and 73.

The above description is of a preferred embodiment of the invention, and many modifications may be made thereto without departing from the spirit and scope of the invention.

What is claimed is:

1. An inertial navigation system comprising a platform with mutually perpendicular X, Y, and Z axes, said X axis adapted to be aligned with north, said Y axis adapted to be aligned with east-west direction, and said Z axis adapted to be aligned with vertical, an accelerometer on said platform positioned to measure the acceleration of said platform along said X axis, an integrating means to integrate the output signal of said accelerometer to produce a signal representing the velocity of said platform along said X axis, Doppler radar means for generating a signal representative of the velocity of said platform along said X axis relative to the earth, velocity combining means to produce a signal varying in accordance with the difference between the velocity represented by the output signal of said integrating means and the velocity of said platform along said X axis determined from said Doppler signal, means responsive to the output signal of said velocity combining means to pivot said platform about said Z axis to reduce the output signal of said velocity combining means, including means to additively combine with the output signal of said accelerometer applied to the input of said integrating means a signal representing the rate at which said platform is being pivoted about said Z axis in response to the output signal of said velocity combining means times the velocity along said Y axis.

2. An inertial navigation system comprising a platform with mutually perpendicular X, Y, and Z axes, said Z axis adapted to be aligned with vertical, said X axis adapted to be aligned with north, and said Y axis adapted to be aligned in the east-west direction, a first accelerometer on said platform positioned to measure the acceleration of said platform along said X axis and produce an output signal representing this acceleration, first integrating means to integrate the output signal of said first accelerometer to produce a signal representing the velocity of said platform along said X axis, a second accelerometer on said platform positioned to measure the acceleration of said platform along said Y axis and produce an output signal representing this acceleration, second integrating means to integrate the output signal of said second accelerometer and produce a signal representing the velocity of said platform along said Y axis, means responsive to the output signals of said first and second integrating means to maintain said Z axis aligned with vertical, Doppler radar means for generating a signal representative of the velocity of said platform along said X axis relative to the earth, velocity combining means to produce an output signal varying in accordance with the difference between the velocity represented by the output signal of said first integrating means and the velocity of said platform along said X axis determined from said Doppler signal, means responsive to the output signal of said velocity combining means to pivot said platform about said Z axis to reduce the output signal of said velocity combining means, including means to derive a signal representing the rate at which said platform is being pivoted about said Z axis in response to the output signal of said velocity combining means times the velocity represented by the output signal of said second integrating means, means to additively combine said derived signal with the output signal of said first accelerometer applied to the input of said first integrating means, and means to additively combine with the output signal of said second accelerometer applied to the input of said second integrating means a signal representing the rate at which said platform is being pivoted about said Z axis in response to the output signal of said velocity combining means times the velocity represented by the output signal of said first integrating means.

3. An inertial navigation system comprising a platform having mutually perpendicular X, Y, and Z axes, said X axis adapted to be aligned with north, said Y axis adapted to be aligned in an east-west direction, and said Z axis adapted to be aligned with vertical, a first accelerometer positioned to sense the acceleration of said platform along said X axis and produce an output signal representing this acceleration, a second accelerometer positioned to sense the acceleration of said platform along said Y axis and produce an output signal representing this acceleration, first integrating means to integrate the output signal of said first accelerometer and produce an output signal representing the velocity of said platform along said X axis, second integrating means to integrate the output signal of said second accelerometer to produce an output signal representing the velocity of said platform along said Y axis, means responsive to the output signals of said first and second integrating means to maintain said Z axis aligned with vertical, Doppler radar means for generating a signal representative of the velocity of said platform along said X axis relative to the earth, velocity combining means to produce an output signal varying in accordance with the difference between the velocity represented by the output signal of said first integrating means and the velocity of said platform along the X axis determined from said Doppler signal, dividing means to produce an output signal varying in accordance with the output signal of said velocity combining means divided by the cosine of the latitude of said platform, means responsive to the output signal of said dividing means to pivot said platform about said Z axis to reduce the output signal of said dividing means, including means to additively combine with the output signal of said first accelerometer applied to said first integrating means a signal varying in accordance with the output signal of said dividing means times the output signal of said second integrating means, and means to additively combine with the output signal of said second accelerometer applied to the input of said second integrating means a signal varying in accordance with the output signal of said dividing means times the output signal of said first integrating means.

4 An inertial navigation system operable in first and second phases comprising program means to switch said system from said first phase to said second phase after a predetermined time interval, a gyro platform having mutually perpendicular X, Y and Z axes, said Z axis adapted to be aligned with vertical, said X axis adapted to be aligned with north, and said Y axis adapted to be aligned in the east-west direction, and control means to control the alignment of said platform, said control means comprising in said first phase:

means to control the alignment of the Z axis of said platform in a damped Schuler mode including inertial means to produce signals representing the velocity of said platform, means responsive to the output signals of said inertial means to maintain the alignment of the Z axis of said platform, Doppler radar means for generating a signal representative of the velocity of said platform along said X axis relative to the earth, velocity combining means to produce signals representing the difference between the velocity represented by the output signals of said inertial means and the velocity of said platform determined from said Doppler signal, means responsive to the output signals of said velocity combining means to change the alignment of said platform to reduce the output signals of said velocity combining means, and means to apply the output signals of said velocity combining means to said inertial means to provide critical damping, said control means comprising in said second phase:

a means to control the alignment of said platform in a damped Schuler mode as recited in said first phase and including means responsive to an output signal of said velocity combining means to gyrocompass the alignment of said X axis to true north.

5. An inertial navigation system operable in first, second, and third phases, comprising Doppler radar means for generating a signal representative of the velocity of said platform along said X axis relative to the earth, program means to switch said system from said first phase to said second phase in response to receiving a signal from said Doppler radar means and to switch said system from said second phase to said third phase after a predetermined time interval, a gyro platform having mutually perpendicular X, Y, and Z axes, said Z axis adapted to be aligned with vertical, said X axis being adapted to be aligned with north, and said Y axis being adapted to be aligned in the east-west direction, and control means to control the alignment of said platform, said control means comprising in said first phase:

a means to control the alignment of the Z axis of said platform in an undamped Schuler mode, said control means comprising in the second phase:

means to control the alignment of the Z axis of said platform in a damped Schuler mode including inertial means to produce signals representing the velocity of said platform, means responsive to the output signals of said inertial means to maintain the alignment of the Z axis of said platform, velocity combining means to produce signals representing the difference between the velocity represented by the output signals of said inertial means and the velocity of said platform determined from said Doppler signal, means responsive to the output signals of said velocity combining means to change the alignment of said platform to reduce the output signals of said velocity combining means, and means to apply the output signals of said velocity combining means to said inertial means to provide critical damping, said control means comprising in said third phase:
    a means to control the alignment of said platform in a damped Schuler mode as recited in said second phase, and including means responsive to an output signal of said velocity combining means to gyrocompass the alignment of said X axis to true north.

6. An inertial navigation system operable in first and second phases comprising means selectively operable to switch said system from said first phase to said second phase, a gyro platform having mutually perpendicular X, Y and Z axes, said Z axis adapted to be aligned with vertical and said X axis adapted to be aligned with a reference, and control means to control the alignment of said platform, said control means comprising in said first phase:
    (1) means to control the alignment of the Z axis of said platform in a damped Schuler mode including inertial means to produce signals representing the velocity of said platform, means responsive to the output signals of said inertial means to maintain the alignment of the Z axis of said platform, Doppler radar means for generating a signal representative of the velocity of said platform along said X axis relative to the earth, velocity combining means to produce signals representing the difference between the velocity represented by the output signals of said inertial means and the velocity of said platform determined from said Doppler signal, means responsive to the output signals of said velocity combining means to change the alignment of said platform to reduce the output signals of said velocity combining means, and means to apply the output signals of said velocity combining means to said inertial means to provide critical damping;
    (2) means to control the alignment of said X axis in a grid mode; and
    (3) means to compute the angle through which said X axis drifts from north during the operation in said first phase,
said control means comprising in said second phase:
    means to control the alignment of the Z axis of said platform in a damped Schuler mode as recited in said first phase and including resolver means responsive to the output signals of said velocity combining means and the angle computed during said grid mode through which said X axis had drifted from north to gyrocompass the alignment of said X axis to a reference offset from north by said computed angle.

References Cited by the Examiner

"Navigating the Supersonic B–58," by W. L. Polkemus, Navigation, vol. 7, Nos. 2 and 3 summer and autumn 1960, pp. 127 to 139.

"X–15 Flight System Shows All Altitudes," by P. J. Klass, Aviation Week, Jan. 12, 1959, pp. 53 to 59.

"Inertial Guidance," by P. J. Klass, Aviation Week Special Report, pp. 4 to 19, received in Patent Office Apr. 25, 1957.

"Schuler Tuning Characteristics in Navigational Instruments," by Walter Wrigley, Navigation, vol. 2, No. 8, December, 1950.

BENJAMIN A. BORCHELT, *Primary Examiner.*

SAMUEL FEINBERG, *Examiner.*

L. L. HALLACHER, W. C. ROCH, *Assistant Examiners.*